March 29, 1927.　　　　　　　　　　　　　　1,622,569
F. W. BIRTCH
METHOD OF AND MEANS FOR HEATING LIQUIDS
Filed Feb. 3, 1923　　　2 Sheets-Sheet 1
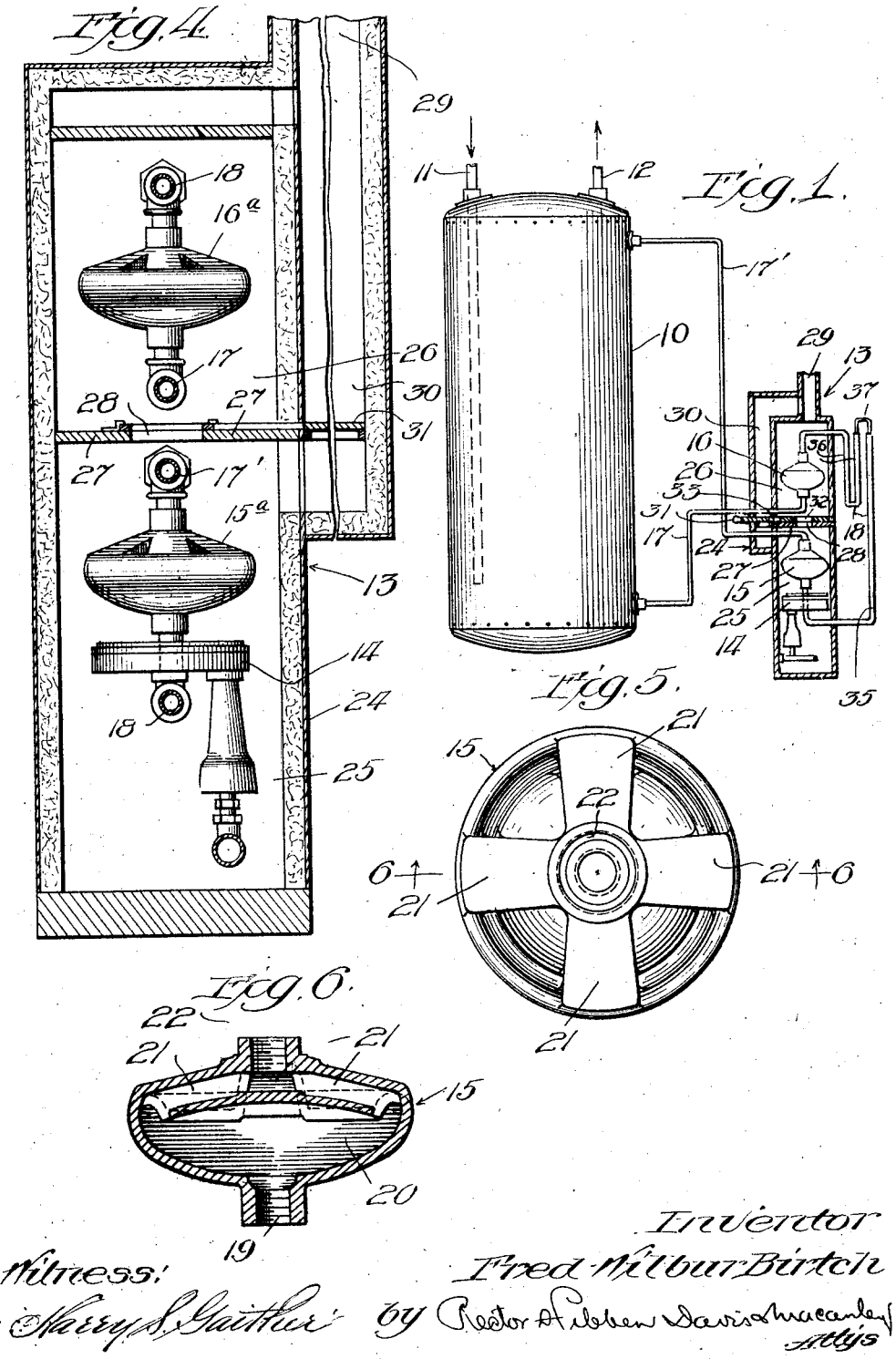

March 29, 1927. 1,622,569
F. W. BIRTCH
METHOD OF AND MEANS FOR HEATING LIQUIDS
Filed Feb. 3, 1923 2 Sheets-Sheet 2
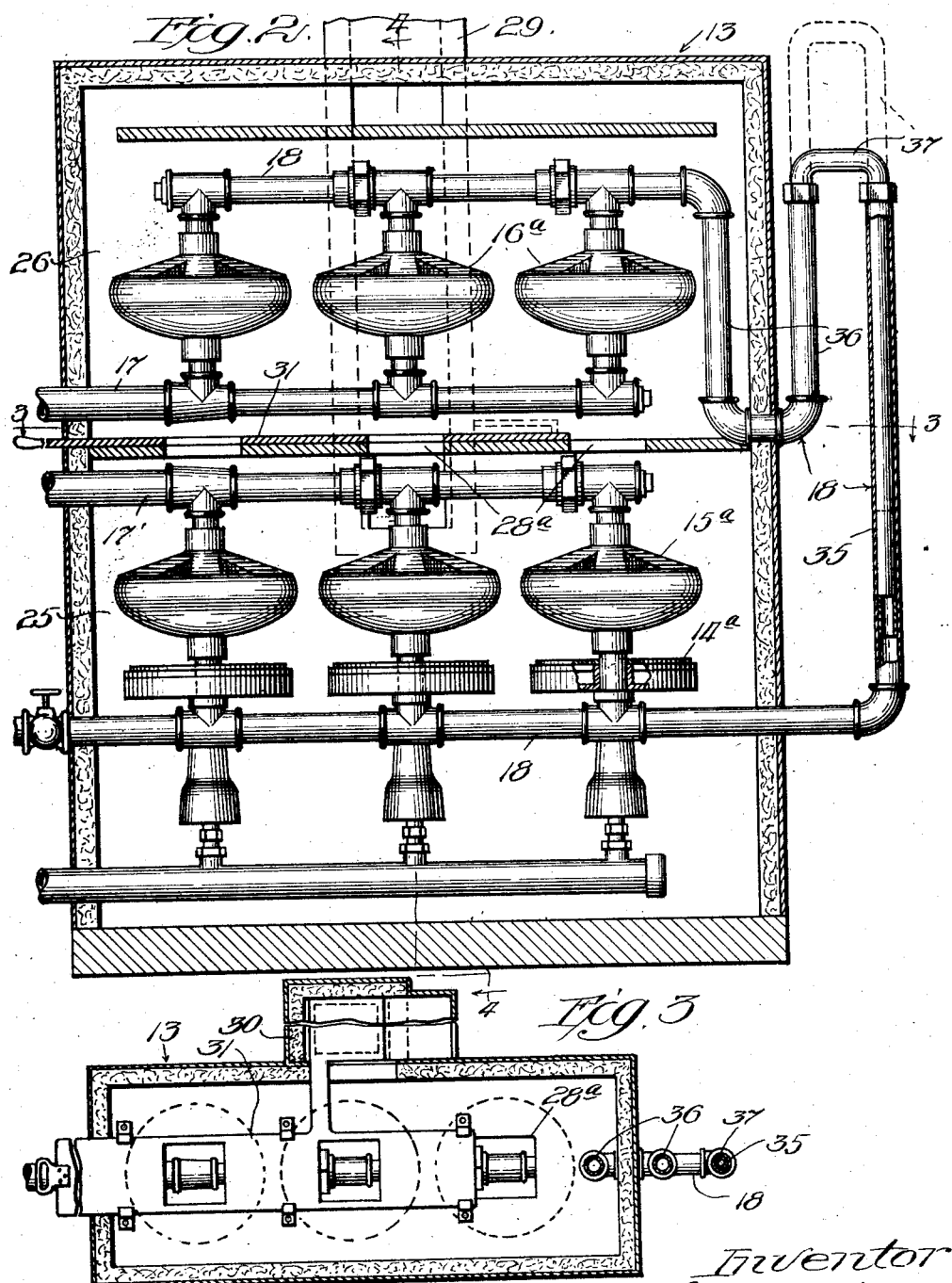

Patented Mar. 29, 1927.

1,622,569

UNITED STATES PATENT OFFICE.

FRED WILBUR BIRTCH, OF LA PORTE, INDIANA, ASSIGNOR TO BASTIAN-MORLEY COMPANY, A CORPORATION OF INDIANA.

METHOD OF AND MEANS FOR HEATING LIQUIDS.

Application filed February 3, 1923. Serial No. 616,867.

My invention relates to the heating of liquids, and has for its general object to provide an improved method of and means for imparting to liquid, that is free to circulate through a constantly-open heating passage, a high temperature rise on a single traverse through the heating passage, substantial commencement of circulation being retarded until the liquid has reached a high temperature.

Circulatory liquid heating installations take many forms for many uses, to which my invention is applicable, but one well-known form is the domestic hot water heater for raising water from its "raw" temperature to a much higher temperature below boiling point, and by way of example my invention will be described as applied to such a use. Frequently such a system comprises a storage tank having a raw water inlet and a service pipe outlet, said tank having also circulatory piping connections to a heat-absorption element of the system, to which element heat is exteriorly applied. Whether such heat-absorption element takes the form of a piping coil, a "spreader", or other passage of the flow piping; and whether the heat applicator takes the form of a gas burner, electric appliance, or other source of heat, the functioning of the ordinary installation is the same. To bring any portion of the water contained in such an ordinary system from a low temperature of say 70 degrees up to a relatively high temperature of say 180 degrees, the entire body of the water in the open circulatory system must be heated to a temperature much above the raw water temperature. The reason is that in an open or unrestricted circulatory system water-flow through the heat-absorption element, engendered by expansion of the water therein, begins with a comparatively small rise of temperature and to secure in the ordinary system such a relatively large temperature rise as that above suggested it is therefore necessary to pass the whole body of water through the heat-absorption element a plurality of times before any of the water attains the high temperature desired.

I believe it to be true that systems have been devised providing valves (either manually controlled or thermostatically controlled) in the flow piping beyond the outlet of the heat-absorption element, adapted to remain closed until the temperature of the water initially in the heat-absorption element is raised to the temperature ultimately desired, and then by variable adjustment of the valve, adapted to maintain approximately a flow-rate such that heat absorption raises the water continuously passing through the heat-absorption element to the stated temperature; and I believe that systems have also been devised (especially for steam-generation) wherein the passages of the heat-absorption element are so choked or restricted in capacity, in proportion to their surface exposure to the applied heat, that the liquid will "flash" to the desired temperature or into steam in a single traverse of the heat-absorption element. To the best of my knowledge, however, no method or means has heretofore been devised affording an open circulatory system,—that is to say, an unrestricted, large-passaged valveless organization,—in which, nevertheless, the liquid may, in a single traverse of a heat-absorption area, be raised in temperature to a very high degree, representing what I term a "high rise" from raw liquid temperature to heated liquid temperature. These seemingly-irreconcilable desiderata I attain by a novel method of treating the liquid, and in an apparatus which may be at once extremely simple, inexpensive, free from complications, facilely regulated or initially constructed to give a desired temperature rise over a considerable range of operations, and susceptible of embodiment in varied specific forms to meet many and varied requirements.

In the drawings, wherein I have illustrated a single, simple embodiment of my invention for purposes of disclosure, a heating system is shown in which the circulatory arrangement includes a storage tank for water to be heated to a temperature below boiling point, the heat applicator being of gas-burner type and the heat-absorption element comprising spreaders; but it will be understood that in its broader aspects my invention is not limited to these selective particulars, and that many changes in construction, arrangement and specific application may be made without departure from the spirit of my invention within the scope of the claims hereto appended.

In the drawings Fig. 1 is a diagrammatic representation of a hot water heating system; Fig. 2 is a vertical section through the heater casing, showing parts in elevation; Fig. 3 is a reduced horizontal section on line 3—3 of Fig. 2; Fig. 4 is a vertical section on line 4—4 of Fig. 2; and Figs. 5 and 6 are details of a convenient form of spreader.

According to the method that I employ for attaining the desired results heretofore stated, I subject the liquid, in an open circulatory system,—valveless and substantially unobstructed—to the application of heat at a plurality (preferably two) of different points or heat-absorption areas, these two areas being so related one to the other that the liquid flow tendency engendered in the one area, by heat-absorption and consequent expansion of the liquid, is resisted or opposed and retarded by the effect of heat supplied to another area; and I supply heat to the liquid in these respective areas in such proportion that the flow-tendency engendered in one area preponderates over the resisting tendency of another area only when the liquid temperature in the dominant area has reached a point relatively high above the raw-liquid temperature.

Such terms as "flow-tendency", "resistance", and "resisting-tendency", I have used herein in their broader sense and in some instances in a somewhat figurative sense, but they aptly and tersely express the actions and force tendencies which occur in the system. I appreciate that circulation of the liquid in the system is due to the fact that the hot liquid is lighter than the cooler liquid and is displaced by the latter.

Referring to Fig. 1, 10 indicates a hot water storage tank to which leads the supply pipe 11 from the city mains or other source of supply and from which leads the service pipe 12. The tank has connections, for location circulation, to a heating structure 13 in which are the heat applicator 14 and the spreaders 15 and 16. In the particular construction shown, a single gas burner 14 may supply heat to both absorption-elements 15 and 16, although if desired separate heaters for these two elements may be provided. These two heat absorption elements are connected "in series", or successively in the circulation system, in free communication with the tank 10. Thus the intake pipe 17 runs from the bottom of tank 10 to the secondary or retarding heat-absorption element 16 and the pipe 17' runs from the primary or dominant heat-absorption element 15 to the top of the tank, while communication pipe structure 18 connects the two heat-absorption elements to complete the circuit.

The spreaders 15 and 16 may be any suitable form, preferably of good heat-absorption efficiency, one suitable construction being shown in detail in Figs. 5 and 6. In such spreaders water may flow through the bottom orifice 19, lower spreading chamber 20 and upper, hollow ribs 21, to the outlet opening 22, all with free, unrestricted passages adequate to the capacity of the flow-piping.

The arrangement for insuring difference in heat-absorption in the two spreaders, or areas for the creation of opposed effects, of water-flow tendency in the one area and flow-resistance in another, may be provided for in various ways, but it is my preference to make the spreaders duplicates in size and construction, and to differentiate, as between the two, the amount of heat supplied thereto; this being one effective manner of insuring that the water will not be heated as fast in one area as in the other, or, more broadly stated, that there will be a difference in the rate of temperature-increase, or heat-absorption rate, as between the two heat-absorption areas. Further, for varying the specific operation of the system, and enabling the user to adjust for a particular temperature rise, variation may be made in the heat-difference affecting the spreaders. As one particular means to this end I have shown the heater 13 as comprising a shell 24 divided into two compartments 25 and 26 for the respective spreaders 15 and 16, the partition 27 having a dampered opening 28. Of course heat supplied from the gas burner 14 first impinges on the dominant spreader 15 but will, with lessened effectiveness, pass through the opening 28 to the secondary spreader 16 before reaching the flue or stack 29. A heat by-pass flue 30 may open from the lower chamber 25 to the stack, and a damper 31 having openings 32 and 33 may control both the port 28 and the by-pass flue 30 to close the former as it opens the latter, and vice versa. Thus the amount of heat delivered to upper chamber 26 is variable and nice variable apportionment of heat supply to the two spreaders is attained. Or the specific operation of the system may be varied by regulating the amount of heat liberated by the burners.

Further, it is as one available manner of insuring that the effect of heating one heat-absorption area of the circulation system will be to resist the flow tendency engendered in the other, dominant area, that I mount the secondary spreader 16 at a higher elevation than the primary, dominant spreader 15. In the communication pipe structure 18, I provide a down leg 35, a U-bend 36 and an extension piping unit 37 (which may be eliminated if desired) in the form of an inverted U the legs of which slidably enter the stated pipes 35 and 36. The cooler and hence heavier liquid in the tank and pipe 17 tends to force the heated, and hence lighter liquid in the secondary spreader 16 upward and it may be said to be "trapped" in the upper spreader and the upper portion of the piping 18, but such "trapped" hot water must flow down the pipe 35 in order to reach the intake side of the dominant spreader 15.

It will be apparent that by reason of the difference in elevation of the spreaders, and the fact that the upper spreader tends only to trap the water heated thereby, rather than to engender a circulation through the whole piping system, the heat-absorption in the lower dominant spreader must materially exceed the heat-absorption in the upper secondary spreader in order that the action of the primary absorption unit on the down-leg shall overcome the resisting or retarding influence of the secondary heating unit 16, this arrangement in different elevations being one desirable manner of insuring that liquid flow will begin only when the heat-absorption in the dominant element greatly exceeds the heat-absorption in the secondary element.

In operation the raw water initially in the tank 10 may stand, say, at 70 degrees when the gas burner 14 is lighted. By the apportionment of heat to the two spreaders, (as one effective manner of insuring a difference in heat-absorption by the liquid contents of one absorption structure as against the other in a given length of time) it is assured that there will not be enough temperature difference between the water in the secondary spreader 16 and the water in the dominant spreader 15 to overcome the resistance or retarding effect of the water in the upper spreader and upper portion of the piping 18 until the liquid in spreader 15 has attained a temperature relatively high above the raw-water temperature; say a rise from 70 degrees to 180 degrees, or other rise. Consequently no hot water flows at all through the pipe 17' to the top of the storage tank until the 180 degree temperature, in the above example, is reached and then circulation starts with a rush. Consequently by running the apparatus for a short time one can heat a shallow body of water at the top of the tank 10 to 180 degrees, still treating with the above example, without affecting (further than to a slight incidental extent due to convection and internal circulation within the tank) the raw water body of 70 degrees temperature therebelow. It will be understood, of course, that the figures given are illustrative, only. When the temperature of the raw water varies (between summer and winter, say) adjustment can be made, as by damper regulation, or variation in heat application, to maintain the desired outflow temperature from the heater.

In Figs. 2 to 4 I have illustrated a construction of larger capacity than could economically be built by mere enlargement of single spreaders as the two respective heat-absorption units, each heat-absorption unit (15ᵃ and 16ᵃ) in the modified form shown being composed of a plurality of spreaders arranged in "parallel" relation, there being a like plurality of burners 14ᵃ, and dampered orifices 28ᵃ preferably severally aligning with the vertical stacks of spreaders.

I claim:

1. The method of initiating liquid flow in an open circulatory system upon a relatively-high rise of temperature, which consists in subjecting to heating conditions that will heat the liquid therein at different rates, a plurality of distinct heat-absorption areas of the circulatory system, these areas being so related that heat-absorption by the liquid in the area having the lesser absorption rate causes said liquid to resist flow to the heat-absorption area having the higher absorption rate.

2. The method of heating liquid in an open circulatory system to result in circulatory flow in response only to a high rise of liquid temperature, which consists in subjecting heat-absorption areas of the flow system, located at different elevations therein and connected in series, to heat application such as to raise the liquid temperature in the area of higher level more slowly than the temperature of the liquid is raised in the heat-absorption area of lower level.

3. The method of initiating liquid flow in an open circulatory system upon a relative-high rise of temperature, which consists in subjecting to heating conditions that will heat the liquid therein at different rates, a plurality of distinct heat-absorption areas of the circulatory system these areas being so related that heat-absorption by the liquid in the area having the less absorption rate causes said liquid to resist flow to the heat-absorption area having the higher absorption rate, and varying the effective supply of heat to said areas to control the temperature rise.

4. The method of heating liquid in an open circulatory system to result in circulatory flow in response only to a relative high rise of liquid temperature, which consists in subjecting heat-absorption areas of the flow system, with the lower one in arrangement to engender circulation and the upper one in arrangement to tend to pocket its heated liquid located at different elevations therein and connected in series, to heat application such as to raise the liquid temperature in the area of higher level more slowly than the temperature of the liquid is raised in the heat-absorption area of lower level.

5. In a liquid heating system, the combination of heat-absorption elements arranged in series in an unobstructed circulatory system, said elements being arranged to permit heat-engendered circulation of the liquid only in accordance with preponderating heat-absorption in one element as compared with the other element, and means for supplying heat to said elements for absorption by the liquid in said elements at different rates.

6. In a liquid heating system, the combination of two heat-absorption elements connected in series in a open circulatory system, said elements being at different elevations, with the top outlet of the upper element connected by a down leg with the bottom inlet of the lower element and means for supplying heat to said elements suitably for absorption at different rates, to heat the liquid of the lower element faster than the liquid of the upper element is heated.

7. In a liquid heating system, the combination of two heat-absorption elements connected in series in an open circulatory system, said elements being at different elevations to provide a hot water trap, and means for supplying selectively apportioned quantities of heat to said elements suitably for absorption at different rates, to heat the liquid of the lower element faster than the liquid of the upper element is heated.

8. In a liquid heating system, the combination of open liquid circulatory passages including two heat absorption areas at different levels, and means for heating said areas simultaneously but to afford a higher absorption rate for the lower-level area than that affecting the higher-level area.

9. The method of initiating fluid flow in a system of the class described which consists in heating a plurality of heat-absorption areas so that one retards the circulatory action of the other.

10. In a fluid heating system, the combination of two heat-absorption areas in series and heating means arranged so that one area is heated more than and retards the circulatory action of the other area.

11. The method of initiating fluid flow in an open circulatory system which consists in arranging a plurality of heat-absorption areas at different levels and heating them so that one acts to retard the circulatory action of the other.

12. The method of initiating fluid flow in an open circulatory system which consists in arranging a plurality of heat-absorption areas at different levels and heating them so that one acts to retard the circulatory action of the other, and varying the effective heating of said areas to control the temperature rise.

13. In a fluid heating system, the combination of two heat-absorption areas in series and at different levels, heating means arranged so that one area is heated more than and retards the circulating action of the other area, and means for varying the effective heating of said areas to control the temperature rise.

In testimony whereof, I have hereunto subscribed at Chicago, Illinois, this 22nd day of January, 1923.

FRED WILBUR BIRTCH.